3,275,593
PRODUCTION OF THERMALLY STABLE POLY-
OXYMETHYLENES BY BOILING IN WATER
Wilhelm Querfurth, Oberursel, Taunus, Germany, assignor to Deutsche Gold- und Silber-Scheideanstalt vormals Roessler, Frankfurt am Main, Germany
No Drawing. Filed May 10, 1963, Ser. No. 279,628
Claims priority, application Germany, May 19, 1962,
D 38,959
6 Claims. (Cl. 260—45.9)

The present invention relates to a process for increasing the heat stability of polyoxymethylenes.

According to the invention it was found that the thermal stability of polyoxymethylenes produced by the polymerization of water free formaldehyde in an inert solvent in the presence of redox catalysts can be increased substantially if they are heated in boiling water for a longer period of time, preferably in the presence of a tertiary amine.

The polyoxymethylenes which are to be treated according to the invention, as has already been indicated, are those which have been produced by polymerization of water free formaldehyde in inert solvents in the presence of redox catalysts comprising an oxidizing component and a reducing component. The oxidizing components of such systems, for example, can be: dialkylperoxides, such as, ditertiary butyl peroxides, diarylperoxides, such as, dicumene peroxide, p,p'-dichlorodibenzoylperoxide; hydroperoxides, such as, butylhydroperoxide, cumene hydroperoxide. The reducing component of such systems, for example, can be aliphatic, primary, secondary or tertiary n-monoamines with 1 to 20 carbon atoms or substituted tertiary aliphatic amines, such as β-phenylethyldibutylamine; aromatic primary, secondary or tertiary monoamines, such as, aniline, diphenylamine, triphenylamine; aromatic diamines, such as, p,p'-bisdimethylamino diphenylmethane, benzidine (4,4'-diaminodiphenyl); quaternary tetraalkyl ammonium compounds, such as cetyl trimethyl ammonium bromide; sulfones, such as, reaction products of toluene sulfinic acid with formaldehyde and primary or secondary aliphatic or aromatic amines. The reducing components can be used singly or in admixture with each other.

A very suitable redox combination consists of an organic peroxide and an aliphatic tertiary amine. In addition, systems composed of one of the above-mentioned peroxides or hydroperoxides with β-phenylethyldibutylamine and/or p,p'-bisdimethylamino-diphenylmethane have proved especially well suited.

In addition, it was found that polyoxymethylenes which not only were produced in the presence of redox systems but in addition in the presence of organic metal compounds, such as, organic compounds of copper, zinc, manganese, calcium, strontium, barium and beryllium, are also suited for the treatment according to the invention. The calcium, strontium, barium and beryllium compounds, namely, the octoates, stearates, palmitates, naphthenates, proved especially suited in this connection, particularly when used in quantities providing the presence of 0.01 to 10 millimols thereof in each mol of polyoxymethylene produced.

The following, for example, are illustrative of the inert solvents in which the polymerization of formaldehyde can be carried out: aliphatic hydrocarbons of 5 to 10 carbon atoms; cycloaliphatic hydrocarbons, such as, decahydronaphthalene; aromatic hydrocarbons, such as, benzene and hydrocarbon mixtures, such as, gasoline.

The polyoxymethylenes which are suited for treatment according to the invention which have been produced by polymerization of formaldehyde as described above have an average molecular weight of about 30,000 to 160,000.

According to the invention such polyoxymethylenes are subjected to the action of boiling water for a longer period of time, if desired, under pressure or under reflux. The treatment is continued until no formaldehyde can be detected in the water. The heating period at normal atmospheric pressure in general amounts to 1 to 8 hours. When superatmospheric pressures, that is, gauge pressures of about 2 to 10 atmospheres, are employed, corresponding to boiling temperatures of about 134° C. to about 185° C., the heating period required does not exceed one hour. The polyoxymethylenes are treated in powdered form in the form of a suspension in water, expediently distilled water, to which also 0.5 to 2.5% by weight of a tertiary amine or a diamine with reference to the polyoxymethylene content can advantageously be added. Benzidine and p,p'-bisdimethylamino-diphenylmethane are admirably suited for this purpose.[1]

The following examples will serve to illustrate the process according to the invention.

*Example 1*

A polyoxymethylene powder produced by the polymerization of water free formaldehyde at a starting temperature of 20° C. with a redox system catalyst of ditertiary butyl-peroxide and p,p'-bisdimethylamino-diphenylmethane in gasoline of a boiling point range of 100–140° C. and having a molecular weight of 53,000, a relative viscosity $\eta_{rel}$ 1.352 (in dimethylformamide at 130° C.) and an OH content of 0.45 mol/kg. (measured according to Verley and Bölsing by treatment with a solution of acetic acid anhydride in pyridine, determining the quantity of acetic anhydride not consumed in the acetylation and calculating the OH content therefrom) was employed as the starting polyoxymethylene product. It, upon heating for 20 minutes to 200° C., suffered a 41% weight loss. 100 grams of such polyoxymethylene powder were boiled in 2 liters of water under reflux for 8 hours and the remaining treated polyoxymethylene filtered off and dried at 100° C. 89 g. of treated polyoxymethylene were recovered. When this product was heated to 200° C. for 20 minutes it only suffered a loss in weight of 12%.

*Example 2*

A polyoxymethylene which was prepared analogously to that of Example 1 suffered a 79% loss in weight upon heating to 200° C. for 20 minutes. 100 g. of this polyoxymethylene were boiled in water under reflux for 5 hours and the remaining treated polyoxymethylene filtered off and dried. 87 g. of treated polyoxymethylene were recovered which upon heating to 200° C. for 20 minutes only suffered a weight loss of 32%. The molecular weight of the polyoxymethylene was 41,000.

Analogously, redox polymers of formaldehyde exhibiting a weight loss upon heating to 200° C. for 20 minutes of 52% and 80% were improved by a treatment under the same conditions so that they only suffered weight losses of 16% and, respectively, 41% upon heating to 200° C. for 20 minutes. The yields were 88% and, respectively, 74% and the molecular weights 51,000 and, respectively, 31,000.

*Example 3*

1680 g. of paraformaldehyde were pyrolysed and purified in the usual manner and the resulting water free formaldehyde (1.5 kg.) introduced in 2½ hours at room temperature into 14 liters of gasoline containing 0.07 millimol of barium naphthenate, 7.0 millimols of ditertiary butyl peroxide, and 35 millimols of p,p'-bisdimethylamino-diphenylmethane. 931 g. of polyoxymeth-

---

[1] Also aromatic vinylic compounds as divinyl benzene are suitable.

ylene were produced of an average molecular weight of 80,000 and an OH content of 0.99 mol/kg. Upon heating for 20 minutes to 200° C. such polyoxymethylene suffered a 51% loss in weight.

100 g. of such polyoxymethylene in powder form were suspended in 2 liters of distilled water and boiled under reflux for 5 hours while stirring. 90 g. of treated polyoxymethylene were recovered. When this product was heated to 200° C. for 20 minutes it only suffered a weight loss of 11% in weight.

*Example 4*

A polyoxymethylene was prepared by a process analogous to that of Example 3 except that the barium, ditertiary butyl peroxide and p,p'-bisdimethylamino-diphenylmethane were reduced by ½ (amount of barium naphthenate=0.35 millimols). The average molecular weight of such polyoxymethylene was 93,000 and its OH content 0.36 mol/kg. The loss in weight thereof upon heating to 200° C. for 20 minutes was 31%. 100 g. of such polyoxymethylene were suspended in 2 liters of distilled water which also contained 2.5 g. p,p'-bisdimethylamino-diphenylmethane and boiled under reflux for 12 hours while stirring. 80 g. of treated polyoxymethylene were recovered which upon heating for 2 hours to 200° C. suffered only a 4% loss in weight.

*Example 5*

2.1 millimols of barium naphthenate, 7.0 millimols of ditertiary butyl peroxide and 7.1 millimols of tributylamine were dissolved in 17 liters of tetrachloroethylene. Liquid water free formaldehyde prepared in the usual manner by pyrolysis of 5000 g. of paraformaldehyde and purification were introduced into such solution over a period of 5 hours. The reaction began at −8° C. and ended at +15° C. 3010 g. of polyoxymethylene of an average molecular weight of 85,000 and an OH content of 0.46 mol/kg. were obtained. Such polyoxymethylene when heated to 200° C. for 20 minutes suffered a 42% loss in weight.

100 g. of such polyoxymethylene were suspended in 2 liters of water containing 0.5 g. of 4,4'-diaminodiphenyl and boiled under reflux for 5 hours while stirring. 87 g. of treated polyoxymethylene were recovered which upon heating to 200° C. for 20 minutes only suffered a 9% loss in weight.

*Example 6*

240 g. of paraformaldehyde were pyrolysed in the usual manner and the resulting water free formaldehyde introduced at about 30° C. over a period of 3 hours into 1.9 liters of gasoline containing 0.1 millimol of barium naphthenate, 1.0 millimol of ditertiary butyl peroxide and 5 millimol of α-methylbenzyl-N,N-diethylolamine, 141 g. of polyoxymethylene of an average molecular weight of 157,000 and an OH content of 0.43 mol/kg. were obtained. Such polyoxymethylene upon heating to 200° C. for 20 minutes suffered a 41% loss in weight.

50 g. of such powdered polyoxymethylene were boiled under reflux in one liter of water while stirring for 5 hours. 43 g. of dry treated polyoxymethylene were recovered while upon heating for 20 minutes at 200° C. suffered an 8% loss in weight.

*Example 7*

15 millimols of Michler's ketone

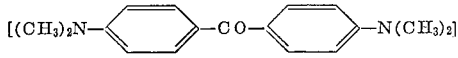

0.3 millimol of barium naphthenate and 3.0 millimols of ditertiary butyl peroxide were dissolved in 6.5 liters of gasoline. 660 g. of paraformaldehyde were pyrolysed and the formaldehyde product purified in the usual manner. The resulting water free formaldehyde was introduced at room temperature into the solution over a period of 2 hours. The 414 g. of polyoxymethylene which were produced had an average molecular weight of 75,000 and an OH content of 0.75 mol/kg. Upon heating such polyoxymethylene to 200° C. for 20 minutes it suffered a 36% loss in weight.

50 g. of such polyoxymethylene were suspended in one liter of water and boiled under reflux while stirring for 5 hours. 48 g. of dry treated polyoxymethylene were recovered which upon heating for 20 minutes at 200° C. suffered a 21% loss in weight.

I claim:

1. A process for improving the heat stability of polyoxymethylenes produced by homopolymerization of water-free formaldehyde in an inert solvent in the presence of a redox system catalyst which comprises heating such polyoxymethylene in boiling water until substantially no formaldehyde can be detected in such water.

2. The process of claim 1 in which such boiling treatment is carried out under a superatmospheric pressure of up to 10 atmospheres.

3. The process of claim 1 in which said boiling water contains 0.5 to 2.5% by weight of a tertiary amine with reference to the polyoxymethylene boiled in such water.

4. The process of claim 3 in which said tertiary amine is p,p'-bisdimethylamino-diphenylmethane.

5. The process of claim 1 in which said boiling water contains 0.5 to 2.5% by weight of a diamine with reference to the polyoxymethylene boiled in such water.

6. The process of claim 5 in which said diamine is benzidine.

References Cited by the Examiner

UNITED STATES PATENTS

| | | | |
|---|---|---|---|
| 2,920,059 | 1/1960 | MacDonald et al. | 260—45.9 |
| 2,985,623 | 5/1961 | Schweitzer et al. | 260—67 |
| 3,174,948 | 3/1965 | Wall et al. | 260—67 |

LEON J. BERCOVITZ, *Primary Examiner.*

M. J. WELSH, *Assistant Examiner.*